United States Patent [19]
Berger

[11] 3,858,569
[45] Jan. 7, 1975

[54] COFFEE BREWING SYSTEM

[75] Inventor: Guenter W. Berger, Rowland Heights, Calif.

[73] Assignee: Farmer Bros. Co., Torrance, Calif.

[22] Filed: Jan. 26, 1973

[21] Appl. No.: 326,738

[52] U.S. Cl............ 126/344, 222/70, 222/146 HE, 99/280
[51] Int. Cl............................................. F24h 1/20
[58] Field of Search............... 126/344, 374, 350 R; 137/505.12, 624.11, 624.12; 251/319; 222/70, 146 HE; 99/280, 281

[56] References Cited
UNITED STATES PATENTS

| | | | |
|---|---|---|---|
| 2,283,355 | 5/1942 | Erickson | 137/505.12 |
| 3,335,753 | 8/1967 | Kiser | 137/624.11 |
| 3,589,271 | 6/1971 | Tarrant | 99/280 |
| 3,719,308 | 3/1973 | Buchtel et al. | 222/70 |

*Primary Examiner*—Charles J. Myhre
*Assistant Examiner*—William C. Anderson
*Attorney, Agent, or Firm*—Nilsson, Robbins, Bissell, Dalgarn & Berliner

[57] ABSTRACT

A coffee brewing system providing a predetermined amount of water to a heating reservoir. Water at line pressure is connected to the inlet of a first water pressure regulator. The first pressure regulator acts as a buffer for the high pressure water line and drops the pressure level to a predetermined level. Water from the first regulator is then connected to a second regulator which provides a relatively constant water pressure output at a pressure level less than that of the first regulator. An actuating mechanism comprising a timer is used to open a valve and allow water from the output of the second water pressure regulator to flow into a heating reservoir. The water pressure output at the second pressure regulator is sufficiently constant so that for a fixed interval of time a predetermined amount of water flows through the valve into the reservoir. In addition, a water filled coil positioned in the heating reservoir provides a small amount of heated water when desired for brewing tea and the like.

5 Claims, 3 Drawing Figures

Patented Jan. 7, 1975

3,858,569

COFFEE BREWING SYSTEM

BACKGROUND OF THE INVENTION

1. Field of the Invention

The field of art to which the invention pertains includes the field of coffee brewing systems, particularly with respect to a system for providing a substantially constant amount of water into a heating reservoir each time it is desired to brew a pot of coffee.

2. Description of the Prior Art

In the U.S. Pat. No. 3,589,271, there is illustrated a coffee brewing system wherein water contained in a heating reservoir is heated to the coffee brewing temperature. Thereafter, a measured quantity of cold water is poured through an inlet to a cold water receiver tank. The cold water is allowed to enter the reservoir and forces the heated water out of the reservoir through a siphon where it is distributed by a spray head onto a charge of coffee contained within a filter cup. The cold water, which displaces the heated water, is then heated so that the system is ready to provide an additional supply of brewed coffee upon the subsequent addition of a measured quantity of water.

Such prior art coffee brewing systems, where the water is inserted manually, are costly to operate in that employee time is utilized to brew coffee, have resulted in spillage by the operator when inserting the water into the inlet, and have resulted in improper amounts of water being added, thus causing less than a full pot of brewed coffee. In addition, such systems require that a supply of water, such as a sink, be accessible to the coffee brewing apparatus and that a container of a predetermined measured amount be available so that the water can be added to the brewing system. Prior art alternative arrangements which enable the water to be automatically added to the system utilize sensing apparatus wherein a valve is disconnected when the water in the reservoir reaches a predetermined level, or a timer which must be adjusted for line pressure variations. Such systems have been found to be unreliable, resulting in overflow of the water in the reservoir, with resultant spillage onto the floor or other surfaces, or delivery of smaller amounts of water than desired.

The present invention enables water of a predetermined quantity to be added automatically to a coffee brewing system each time a desired amount of coffee is to be brewed, irrespective of the line pressure at the water inlet. Automatic shutoff occurs once the water has been added to the system. The system can be installed without adjustments due to varying water pressure.

SUMMARY OF THE INVENTION

A coffee brewing system for providing a predetermined amount of water to a heating reservoir. Water pressure regulating means are utilized between line pressure and a control means. The control means causes water at a constant pressure to flow from the regulating means to the reservoir for a predetermined interval of time. Means are provided for removing the heated water from the reservoir each time the reservoir is filled.

DESCRIPTION OF THE PREFERRED EMBODIMENT

Figure 1:
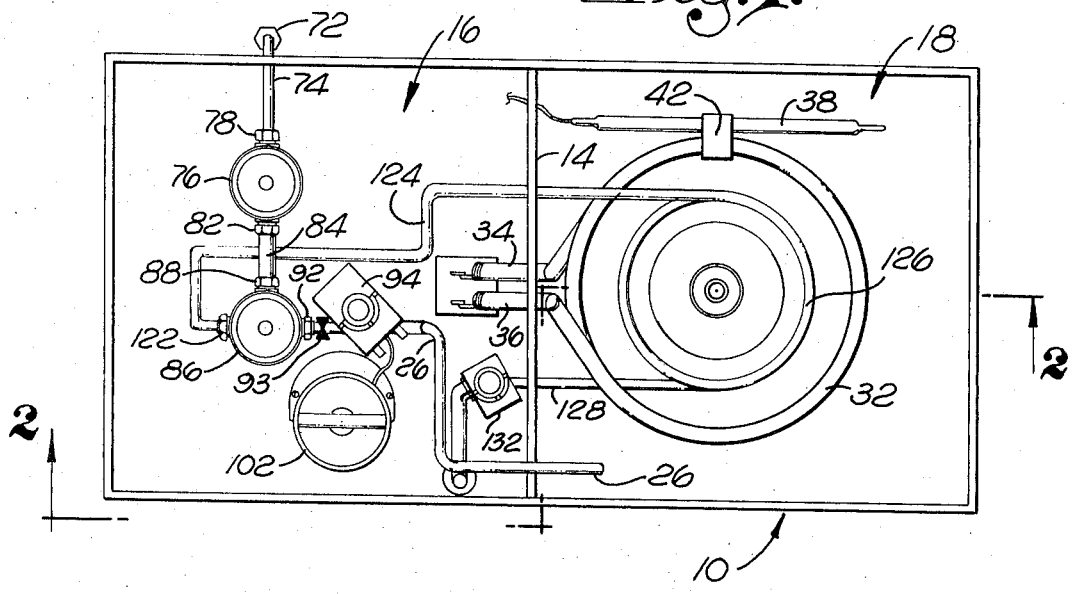
FIG. 1 is a plan view of the coffee brewing system made in accordance with the invention.

Referring now to FIG. 1, there is shown a coffee brewing system made in accordance with principles of the invention. A plan view of the coffee brewing system is illustrated in FIG. 1 with the top wall 12 of the container 10 removed. Typically, the container 10 may be formed of a plastic material capable of withstanding water at nearly its boiling temperature. The configuration of the container can be of the type illustrated in the aforementioned U.S. Pat. No. 3,589,271. Examples of container material are any thermoplastic material which has high temperature resistance qualities as well as good thermal insulating properties. The container 10 is divided by means of a transverse wall 14 into a control section 16 and a reservoir section 18.

Figure 2:
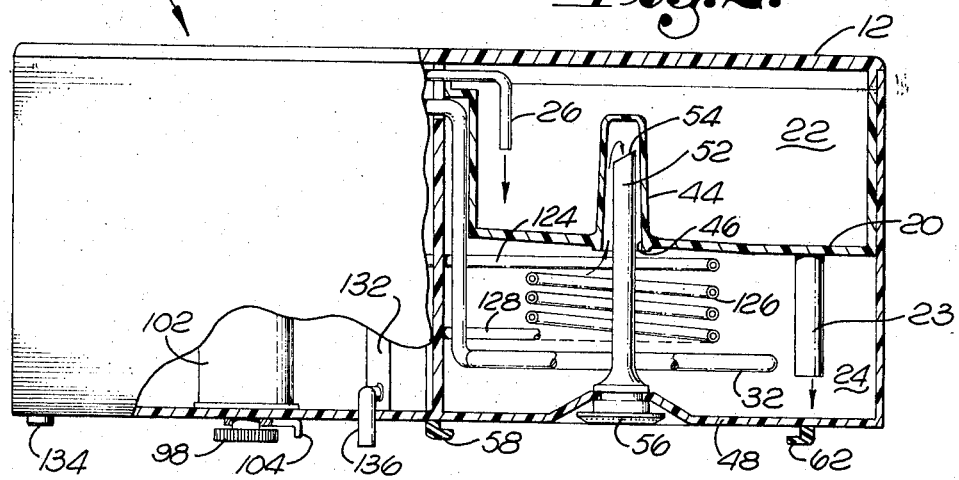
FIG. 2 is a side view in section of the coffee brewing system of FIG. 1 taken along the line 2—2 thereof.

As can be seen in FIG. 2 the reservoir section 18 is divided by means of a wall 20 into an upper inlet chamber 22 and a lower heating chamber 24. The wall 20 is removed in the illustration of FIG. 1. Inlet water into the inlet chamber 22 of the reservoir section 18 is provided by means of an inlet tube 26. In prior art systems where the water was manually fed into the reservoir section 18, the top wall 12 of the container 10 normally was formed of a grid with a removable cover positioned on the top of the reservoir section enabling water to be poured from a container into the reservoir section. This grid has been replaced in the present invention by the inlet tube 26.

As the water from the inlet tube 26 is fed into the inlet chamber 22, it strikes the top surface of the wall 20 and flows to the right as illustrated in the drawing in FIG. 2 due to the slight slope of the wall 20. The water in the inlet chamber 22 flows into the heating chamber by means of a water discharge tube 23 which is integrally formed with the bottom surface of the wall 20 and enables water to enter the heating chamber 24 near the bottom thereof. Typically, the initial amount of water fed into the heating chamber is sufficient to fill the heating chamber with water.

A heating element 32 is positioned in the heating chamber 24 and is of generally circular configuration with each end of the heating element 32 connected by means of extensions 34 and 36, (FIG. 1), respectively, to the control section 16. In addition, a sensing element 38 is supported along side, but spaced from the heating element 32 by means of a combined clamp and heat transferring device 42 which is formed of a strip of metal which folds around the heating element and the sensing element. The combined clamp and heat transferring device 42 is of sufficient size so that should the heating element be energized when there is no water in the heating chamber 24, sufficient heat would be transferred to the sensing element 38 to disconnect the power supply connected to the extensions 34 and 36 by switching means (not shown) prior to the heating element reaching an excessive temperature. In addition, the sensing element 38 can be utilized to disconnect the power supply from the extensions 34 and 36 when the water temperature reaches the desired level.

In normal operation, once the water in the heating chamber reaches a desired predetermined temperature, a signal light (not shown) is actuated so that the operator knows that the system is ready to brew a pot of coffee. Then an additional amount of water is inserted into the inlet chamber 22. The additional water flows through the discharge tube 23 into the heating chamber. A siphon cap 44 is formed integrally with the wall 20 and extends into the inlet chamber 22. An opening 46 formed at the cap 44 in the wall 20 enables water in the heating chamber to flow into the siphon cap 44.

Positioned in the siphon cap 44 and extending to the bottom wall 48 of the reservoir section 18 is a siphon tube 52. An opening 54 is formed at the top end of the siphon tube 44. As cold water from the discharge tube 23 enters the heating chamber 24 it forces the heated water in the chamber up into the opening 46. The water flows between the outer surface of the siphon tube 52 and the inner surface of the siphon cap 44 and enters the opening 54 of the siphon tube. The heated water then flows into the siphon tube where it is discharged through a spray head 56 formed on or extending from the exterior surface of the bottom wall 48. Typically, the bottom wall 48 contains a pair of guide members 58, 62, into which the flanges of a conventional brewing vessel, (not shown), can be inserted for receiving the water from the spray head 56. The brewing system described to this point is conventional and is operationally of the type described in the aforementioned patent.

Figure 3:
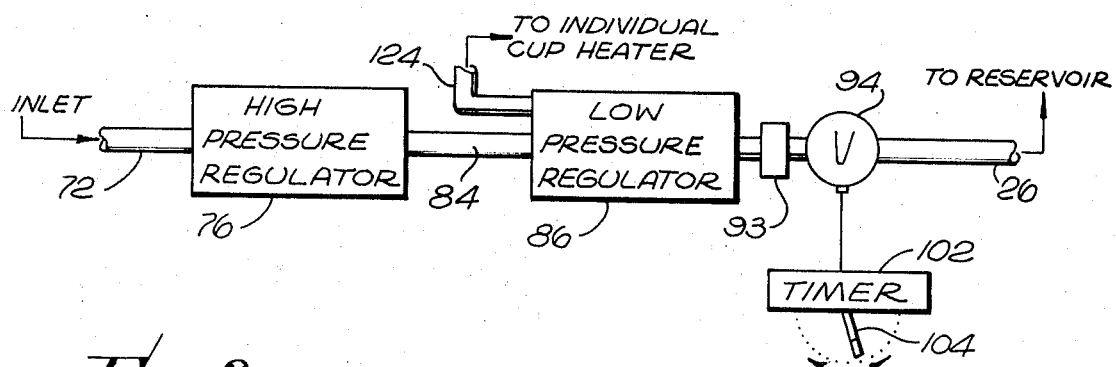
FIG. 3 is a schematic illustration of the water pressure regulating system used in the brewing system of FIG. 1.

A water inlet line 72 is connected to the control section 16 and is coupled via a first pipe 74 to a high pressure water regulator 76 at its inlet end 78. The outlet end 82 of the regulator 76 is connected by means of a pipe 84 to a low pressure water regulator 86 at its inlet end 88. The outlet end 92 of the regulator 86 is connected through a restricted orifice 93 to a control valve 94. The outlet of the control valve is connected to the pipe 26. The control valve allows water to enter the pipe 26 when the valve is open and water is flowing therethrough. A control button 98 on the exterior panel, when depressed, actuates a timer 102 which in turn opens the control valve 94 for a predetermined amount of time. The amount of time the control valve is opened can be varied by means of an adjustable crank 104 connected to the timer 102. Thus, positioning of the crank to various intermediate positions, causes the timer 102 to open the valve 94 for differing amounts of time and enables less than a full pot of coffee to be brewed. As can be seen, the amount of water removed from the siphon 52 is equal to the amount of water which passes from the control valve 94 into the heating chamber 24. The pressure regulation system is shown schematically illustrated in FIG. 3.

The high pressure regulator 76 functions as a buffer between line water pressure and the inlet chamber 22. As is well known, water pressure in a given area may experience a wide change from time to time as a result of usage or central system variance. Furthermore, line water pressure in one part of the world may vary substantially from that in another. Such variations in line water pressure would cause variations in the amount of water delivered to the inlet chamber over the same predetermined time period. If the line water pressure dropped substantially, then less than the predetermined quantity of water would be delivered to the inlet chamber resulting in smaller and smaller amounts of water being delivered through the spray head 56. On the other hand, if the line water pressure increased substantially, then a greater amount of water would be delivered into the inlet chamber causing an overflow of water when coffee is brewed with concomitant soiling of the surrounding area. By using the high pressure regulator, the line pressure is reduced to a predetermined level irrespective of variations therein. Such predetermined level of water pressure is then connected to the low pressure regulator 86. Thus, the output pressure of the regulator 86 will be substantially constant because the input thereto will be substantially constant (within normal range of regulator variation responsive to input pressure changes). Further, the restricted orifice 93 creates a back pressure at the output side of the regulator 86, to provide a more consistent output pressure and thereby a constant flow into the reservoir section 18.

As one example, the high pressure water regulator 76 is set to drop the line pressure in the line 72 to approximately 30psi (pounds per square inch). The water pressure at the outlet 82 which is 30 psi is then connected to the low pressure water regulator 86 which produces a 10 psi output at its output end 92. Thus, with a constant output water pressure level into the valve 94, when the timer 102 opens the valve 94 for a predetermined amount of time, a predetermined amount of water will flow into the reservoir section 18 through the pipe 26 each time the button 98 is momentarily depressed. Thus it can be seen that a coffee brewing apparatus may be installed and used without requiring any adjustment to accommodate local water pressure conditions at the time of installation or thereafter.

The present invention in addition provides a limited amount of hot water without draining water from the heating chamber 24. Typically, such an arrangement can be utilized in a facility which normally consumes large amounts of coffee but also has certain individuals who desire a cup of hot water for tea, boullion, hot chocolate, or the like. In such a case the present invention provides a simplified form of producing individual cups of hot water. Connected to the inlet side of the pressure regulator 86 is an output connection 122. This connection is connected to a pipe 124 which in turn is coupled through the wall 14 to one end of a coil 126 positioned in the heating chamber 24. The other end of the coil 126 is connected back through the wall 14 by means of an outlet pipe 128 and into a valve 132 which is operable to discharge water in the coil 126 as long as a button 134 is depressed, thus enabling water to flow through a spigot 136. The heated water in the chamber 24 is utilized to heat the coil 126 which in turn heats the water therein. Thus, when the button 134 is depressed the heated water in the coil 126 is discharged providing a hot cup of water.

I claim:

1. A coffee brewing system for providing a predetermined amount of water to a heating reservoir comprising:

water pressure regulating means comprising a first water pressure regulator and a second water pressure regulator, said first water pressure regulator having an inlet to which an inlet water line is connected and an outlet connected to an inlet of said second water pressure regulator for providing water at said second water pressure regulator inlet at a first predetermined water pressure level;

control means for allowing said water to flow from said regulating means to said reservoir for a predetermined interval of time and fill said reservoir with a predetermined amount of water;

means for removing heated water from said reservoir each time said reservoir is filled; and wherein said reservoir contains a first coil for heating said water in said reservoir, a second coil in said reservoir interconnected at one end to a water supply wherein water in said coil is heated, and manually actuatable means for removing heated water in said second coil independent of said water in said reservoir.

2. A coffee brewing system in accordance with claim 1, wherein said water supply to said second coil is connected to the inlet end of said second water pressure regulator.

3. A coffee brewing system for providing a predetermined amount of water to a heating reservoir comprising:

a container structure comprising a control section and a reservoir section, said reservoir section being divided into an upper inlet chamber and a lower heating chamber;

an inlet tube coupling inlet water from said control section into said reservoir section at said upper inlet chamber;

a discharge tube for feeding water from said upper inlet chamber into said heating chamber;

syphon means for coupling water from said heating chamber to a spray head for discharging heated water each time water from said inlet tube is fed into said upper inlet chamber;

said control section comprising water pressure regulating means including a first water pressure regulator and a second water pressure regulator, said first water pressure regulator having an inlet to which an inlet water line is connected and an outlet connected to an inlet of said second water pressure regulator for providing water at said second water pressure regulator inlet at a first predetermined water pressure level, said second water pressure regulator having an outlet for providing water at a second pressure level which is less than the first water pressure level at said second water pressure regulator inlet; and means including a valve for allowing said water to flow from said regulating means to said inlet tube, and an adjustable timer for controlling said valve operation for a predetermined interval of time and filling said reservoir with a predetermined amount of water.

4. A coffee brewing system in accordance with claim 3 wherein a restricted orifice is coupled to the outlet of said second water pressure regulating means for providing a constant flow at the second water pressure regulator outlet.

5. A coffee brewing system in accordance with claim 3 wherein said first and second water pressure regulators are non-adjustable.

* * * * *